United States Patent
Hung et al.

(10) Patent No.: US 10,740,667 B2
(45) Date of Patent: Aug. 11, 2020

(54) TEMPERATURE TRIGGERED SWITCH

(71) Applicant: International Business Machines Corporation, Armonk, NY (US)

(72) Inventors: Li-Wen Hung, Mahopac, NY (US); Jae-Woong Nah, Closter, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/913,535

(22) Filed: Mar. 6, 2018

(65) Prior Publication Data

US 2019/0279062 A1    Sep. 12, 2019

(51) Int. Cl.
*G01K 1/02* (2006.01)
*G06K 19/07* (2006.01)
(Continued)

(52) U.S. Cl.
CPC .......... *G06K 19/0717* (2013.01); *G01K 1/02* (2013.01); *G01K 11/06* (2013.01);
(Continued)

(58) Field of Classification Search
CPC .... H01L 23/49811; H01L 24/11; H01L 24/13; H01L 24/16; H01L 2224/0345; H01L 2224/0361; H01L 2224/03912; H01L 2224/05568; H01L 2224/05647; H01L 2224/10145; H01L 2224/11622;
(Continued)

(56) References Cited

U.S. PATENT DOCUMENTS 6,204,136 B1 * 3/2001 Chan ................. H01L 21/31116
257/E21.252
7,724,136 B2    5/2010 Posamentier
(Continued)

FOREIGN PATENT DOCUMENTS

WO    WO-2016207719 A1 * 12/2016 ............... B23K 1/19

OTHER PUBLICATIONS

Babar et al., "Passive UHF RFID Tag for Heat Sensing Applications," IEEE Transactions on Antennas and Propagation, Sep. 2012, pp. 4056-4064, vol. 60, No. 9, 9 pages.
(Continued)

*Primary Examiner* — Hai Phan
*Assistant Examiner* — Anthony D Afrifa-Kyei
(74) *Attorney, Agent, or Firm* — Amin, Turocy & Watson, LLP

(57) ABSTRACT

Apparatus, systems, and methods for determining a temperature excursion are provided. In one example, a system can comprise a temperature switch component that experiences a temperature excursion associated with a metal alloy of the temperature switch component and one or more electrodes, wherein the temperature excursion is based on a temperature of the metal alloy exceeding a defined threshold value. Additionally, the system can comprise a radio frequency identification tag component that receives a signal, from an external reader device, utilized to determine that the temperature excursion has occurred based on a parameter change, associated with the temperature excursion, from a first parameter to a second parameter different than the first parameter.

13 Claims, 12 Drawing Sheets

(51) Int. Cl.
  *G06K 19/077* (2006.01)
  *G01K 11/06* (2006.01)
  *H01H 37/76* (2006.01)
  *G06K 19/073* (2006.01)

(52) U.S. Cl.
  CPC ... *G06K 19/0702* (2013.01); *G06K 19/07345* (2013.01); *G06K 19/07749* (2013.01); *H01H 37/76* (2013.01)

(58) Field of Classification Search
  CPC . H01L 2224/11827; H01L 2224/11831; H01L 2224/13082; H01L 2224/13111; H01L 2224/13124; H01L 2224/81193; H01L 2224/81203; H01L 2224/81815; H01L 2224/81937; H01L 24/81; H01L 2924/00014; H01L 2224/0401; H01L 2224/05023; H01L 2224/05147
  See application file for complete search history.

(56) References Cited

U.S. PATENT DOCUMENTS

| | | |
|---|---|---|
| 8,343,437 B2 | 1/2013 | Patel |
| 8,618,914 B2 | 12/2013 | Bachman et al. |
| 8,957,780 B2 | 2/2015 | Cooperman et al. |
| 9,514,432 B2 | 12/2016 | Cyman, Jr. et al. |
| 9,581,501 B2 | 2/2017 | Kozono et al. |
| 2004/0185323 A1* | 9/2004 | Fowler ............... H01M 4/8605 429/440 |
| 2012/0056002 A1* | 3/2012 | Ritamaki ........... G06K 19/0723 235/492 |
| 2012/0306095 A1* | 12/2012 | Han ..................... H01L 25/0657 257/774 |
| 2013/0033364 A1* | 2/2013 | Raz .................... G06K 19/0716 340/10.1 |
| 2013/0076492 A1* | 3/2013 | Shih ................... H05K 7/20836 340/10.5 |
| 2013/0140696 A1* | 6/2013 | Aoi ................... H01L 23/49811 257/737 |
| 2014/0220767 A1* | 8/2014 | Hu ..................... H01L 29/66545 438/585 |
| 2015/0228893 A1* | 8/2015 | Narayanan .......... H01L 45/1233 257/4 |
| 2017/0255854 A1 | 9/2017 | Bhatia et al. |
| 2019/0074047 A1* | 3/2019 | Salmon ................... G11C 11/24 |

OTHER PUBLICATIONS

Ganesan et al., "Design of an Organic Electronic Label on a Flexible Substrate for Temperature Sensing," Proceedings of the ESSCIRC, 2013, pp. 423-426, IEEE, 4 pages.

Lorite et al., "Novel, Smart and RFID Assisted Critical Temperature Indicator for Supply Chain Monitoring," Journal of Food Engineering, 2017, vol. 193, pp. 20-28, Elsevier, 9 pages.

\* cited by examiner

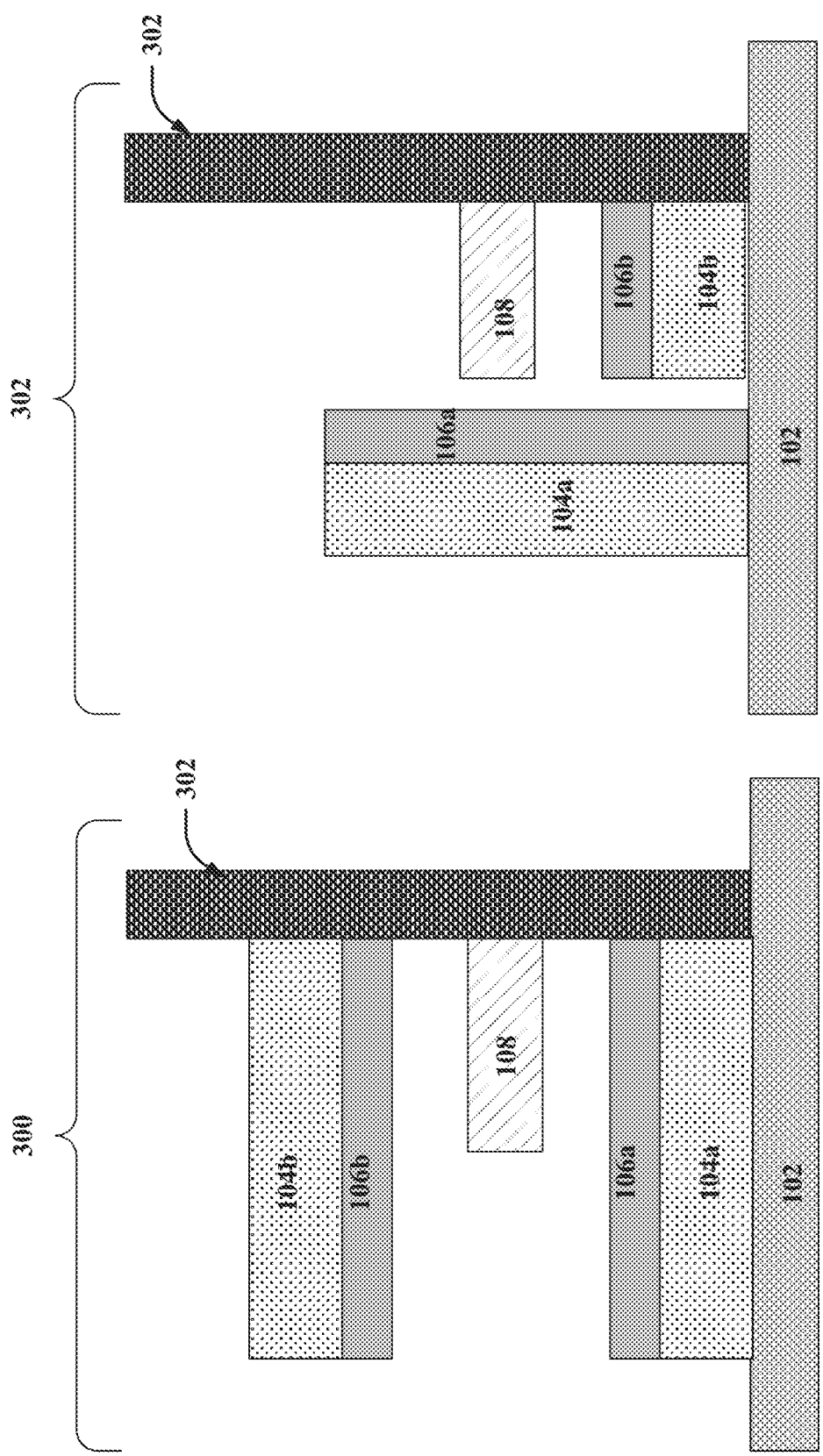

1000

1002

CAUSING A METAL ALLOY TO MELT AND CONTACT A FIRST ELECTRODE AND SECOND ELECTRODE BASED ON A TEMPERATURE EXCURSION OF THE METAL ALLOY, RESULTING IN A CONTACT, WHEREIN THE CONTACT FORMS AN ELECTRICAL CONNECTION BETWEEN THE FIRST ELECTRODE AND THE SECOND ELECTRODE

1004

TRANSMITTING A SIGNAL, TO AN EXTERNAL READER DEVICE, UTILIZED TO DETERMINE THAT THE TEMPERATURE EXCURSION HAS OCCURRED BASED ON A CONFIGURATION CHANGE ASSOCIATED WITH THE ELECTRICAL CONNECTION

FIG. 10

TEMPERATURE TRIGGERED SWITCH

BACKGROUND

The subject disclosure relates to integrated circuit packaging, and more particularly to facilitating long-term temperature monitoring.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, an apparatus and/or methods that facilitate a temperature triggered switch are described.

According to an embodiment, an apparatus is provided. The apparatus can comprise a first electrode and a second electrode disposed on a substrate layer, wherein the first electrode comprises a first metal sidewall, wherein the second electrode comprises a second metal sidewall, and wherein there is a gap between the first metal sidewall and the second metal sidewall. The apparatus can also comprise a metal alloy disposed on the substrate layer and within the gap, wherein the metal alloy melts based on a temperature excursion of the metal alloy and the melting causes the metal alloy to contact the first metal sidewall and the second metal sidewall causing an electrical connection between the first metal sidewall and the second metal sidewall.

According to another embodiment, a system is provided. The system can comprise a temperature switch component that experiences a temperature excursion associated with a metal alloy of the temperature switch component and one or more electrodes, wherein the temperature excursion is based on a temperature of the metal alloy exceeding a defined threshold value. Additionally, the system can comprise a radio frequency identification tag component that receives a signal, from an external reader device, utilized to determine that the temperature excursion has occurred based on a parameter change, associated with the temperature excursion, from a first parameter to a second parameter different than the first parameter.

According to yet another embodiment, a method is provided. The method can comprise causing a metal alloy to melt and contact a first electrode and second electrode based on a temperature excursion of the metal alloy, resulting in a contact, wherein the contact forms an electrical connection between the first electrode and the second electrode. Additionally, the method can comprise transmitting a signal, to an external reader device, utilized to determine that the temperature excursion has occurred based on a configuration change associated with the electrical connection.

These and other features and advantages will become apparent from the following detailed description of illustrative embodiments thereof, which is to be read in connection with the accompanying drawings.

DESCRIPTION OF THE DRAWINGS

FIGS. 3A and 3B illustrate non-limiting views of a temperature switches in alternate configurations in accordance with one or more embodiments described herein.

FIG. 10 illustrates a flow diagram of an example, non-limiting method for facilitating a determination of a temperature excursion in accordance with one or more embodiments described herein.

DETAILED DESCRIPTION

Figure 1A:
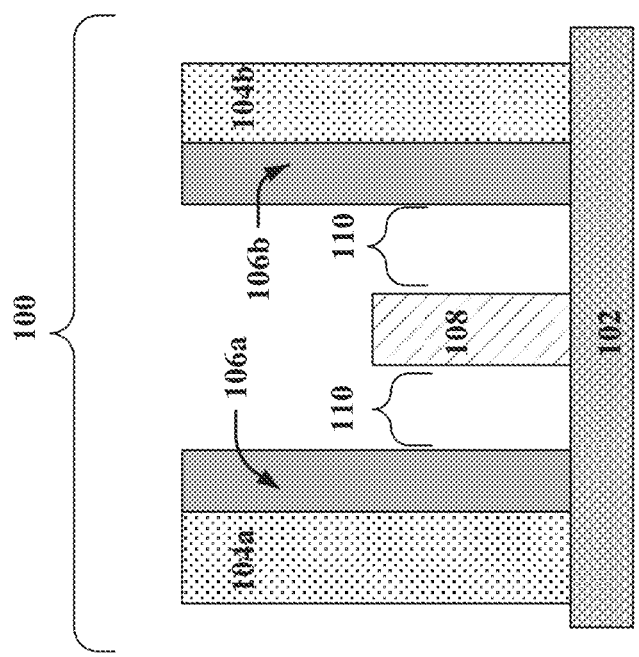
FIG. 1A illustrates a non-limiting view of a temperature switch in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Temperature sensors can be used for a variety of reasons. For example, temperature sensors can be attached to any product that is sensitive to temperature change (e.g., medications, food, etc.). However, most temperature sensors require a battery. This disclosure discloses a temperature sensor that can utilize the physical properties of metal alloys so that the temperature sensor does not require power. When a temperature excursion occurs, a physical change of the temperature sensor can be permanent. Therefore, the ability of the metal alloy to stick to another surface (e.g., wetting property and a surface tension associated with the metal alloy) can cause the metal alloy to form in the shape of a ball after a temperature excursion. For most applications, one temperature excursion is enough to determine that an action should be taken (e.g., disposal of food or medications).

A temperature switch can be connected to a passive radio frequency identification (RFID) tag to facilitate a configuration change of an antenna, a capacitor, an array, and/or a memory. For example, in one embodiment, the temperature switch can be made where the temperature switch can short an antenna (passive antenna) and change the resonant frequency of the antenna. An external reader can be used to scan the temperature switch and detect a frequency change (e.g., parameter change) of the antenna, thus indicating an occurrence of a temperature excursion. In another embodiment, an impedance change (e.g., parameter change) of a capacitor can be used to determine that a temperature excursion has occurred based on the external reader sending a signal to the temperature switch. Although a microchip can be bonded to an external antenna, the antenna can rely on the temperature switch to make a connection for the antenna to be activated. An array of temperature switches can also be used to facilitate determination of a temperature excursion.

If the entire chip is in sleep mode (e.g., chip is not on), the temperature switch can then activate a battery to power on the chip for the chip to begin to record data. Thus, the temperature switch can be used as a trigger to initiate other sensors and circuitry. The temperature switch can be manufactured so that the temperature switch is on or off. If the temperature switch is manufactured as off, then a temperature excursion can cause the temperature switch to turn on. Conversely, if the temperature switch is manufactured as on, then a temperature excursion can cause the temperature switch to turn off. Depending on a metal alloy of choice and the temperature switch configuration, the threshold of the temperature and exposure duration can be engineered according to a desired outcome. The larger the metal alloy, the more energy required to melt the metal alloy. Therefore, if a temperature excursion happens quickly, the temperature switch might not be triggered. Thus, by controlling the volume of the metal alloy and/or a gap spacing between the metal alloy and the electrodes, a time value can be associated with the temperature excursion.

It is to be understood that the present disclosure can be described in terms of a given illustrative architecture comprising an integrated circuit; however, other architectures, structures, materials and process features and steps can be varied within the scope of the present invention.

It should also be understood that when an element such as an interface layer, load, etc. is referred to as being "on" or "over" another element, it can be directly on the other element or intervening elements can also be present. In contrast, when an element is referred to as being "directly on" or "directly over" another element, there are no intervening elements present. It should also be understood that when an element is referred to as being "connected." or "coupled" to another element, it can be directly connected or coupled to the other element or intervening elements can be present. In contrast, when an element is referred to as being "directly connected" or "directly coupled" to another element, there are no intervening elements present.

FIG. 1A illustrates a non-limiting view of a temperature switch 100 in accordance with one or more embodiments described herein. The temperature switch 100 is in a state prior to experiencing a temperature excursion and can comprise a substrate 102, one or more electrodes 104a, 104b, one or more surfaces 106a, 106b (e.g., a metal surface), and one or more metal alloys 108. It should be noted that the temperature switch can be built on a back end of line (BEOL) of a complimentary metal-oxide semiconductor (CMOS), a flexible material, and/or a flexible antenna. Once the temperature exceeds the melting point of the metal alloy 108, the metal alloy 108 can melt and wet (e.g., come into contact with and stick to) the surfaces 106a, 106b, which will electrically short the electrodes 104a, 104b. After the temperature decreases below the melting point of the metal alloy 108, the metal alloy 108 solidifies and remains in contact with the electrodes 104a, 104b. Thus, the shorted electrodes 104a, 104b can indicate that at least one temperature excursion has occurred, which is sufficient to justify an action (e.g., discard a medication).

The metal alloy 108 can be a liquid metal alloy, comprising a high surface tension, to yield a wetting property of the metal alloy 108. Because different metal alloys 108 comprise different temperature thresholds, different metal alloys 108 can be used in conjunction with the temperature switch to facilitate a temperature excursion based on the temperature threshold of the metal alloy 108. For example, a first metal alloy 108 (e.g., 100 molecules of Gallium) with a lower temperature threshold (e.g., 30 degrees Celsius) can experience a temperature excursion before a second metal alloy 108 (e.g., 100 molecules of tin) with a higher temperature threshold (e.g., 232 degrees Celsius). Therefore, utilizing the first metal alloy 108 with the temperature switch 100 can result in the switch being activated or deactivated at a lower temperature than that of a temperature switch utilizing the second metal alloy 108. It should also be noted that different metal alloys 108 can be deposited via different depositing methods. For example, a pure metal and binary alloy can be deposited by an electroplating method. A pure metal, binary alloy, and/or ternary alloy can also be deposited by an injection molded solder method. Alternatively, a solder paste printing method can be used to achieve a wider pitch and larger size alloy.

Additionally, different volumes of the metal alloy 108 can be used alone with different gap spacing 110 between the metal alloy 108 and the surfaces 106a, 106b. The surfaces 106a, 106b can also comprise a wetting property that attracts the metal alloy 108 to the surface 106a, 106b during a temperature excursion. The gap spacing 110 can be used to detect temperature excursion as a function of time (e.g., a thermal budget proportional to a temperature value multiplied by a time value). For example, the wider the gap spacing 110, the longer it will take an electrical connection between the surfaces 106a, 106b, via the melted metal alloy 108, to occur. Thus, the gap spacing 110 can be determined based on the volume of the metal alloy 108 used between the surfaces 106a, 106b. Alternatively, if it is desired that a first surface 106*a*, 106*b* is contacted by the melting metal alloy 108 first, during a temperature excursion, then the metal alloy 108 can initially be placed closer to the first surface 106*a* than it is placed to the second surface 106*b*. Thus, the first surface 106*a* will be contacted first by the metal alloy 108 during a temperature excursion due to a smaller gap spacing 110 between the metal alloy 108 and the first surface 106*a*.

Figure 1B:
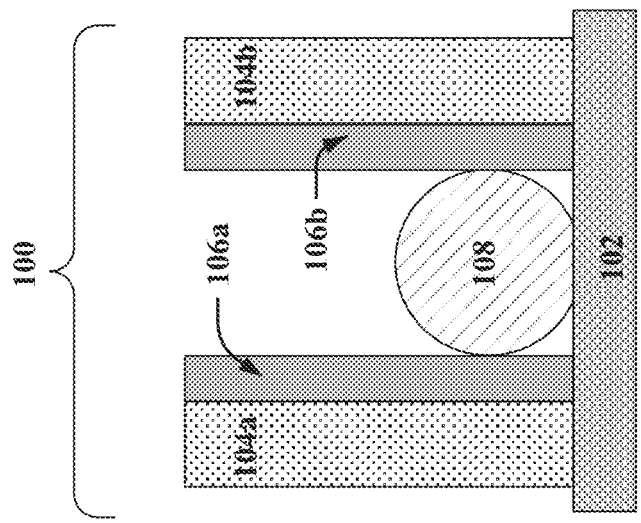
FIG. 1B illustrates a non-limiting view of a temperature switch experiencing an excursion in accordance with one or more embodiments described herein.

FIG. 1B illustrates a non-limiting view of a temperature switch experiencing an excursion in accordance with one or more embodiments described herein. Repetitive description of like elements employed in other embodiments described herein is omitted for sake of brevity.

FIG. 1B represents FIG. 1A after the temperature switch 100 of FIG. 1A has experienced a temperature excursion (e.g., the temperature is greater than the melting point of the metal alloy 108) causing the metal alloy 108 to melt and connect with the surfaces 106*a*, 106*b*, thus creating an electrical connection between the electrodes 104*a*, 104*b*. After the temperature returns to below the melting point of the metal alloy 108, the metal alloy 108 can solidify and remain connected to the electrodes, thus indicating that at least one temperature excursion has occurred.

Figure 2A:
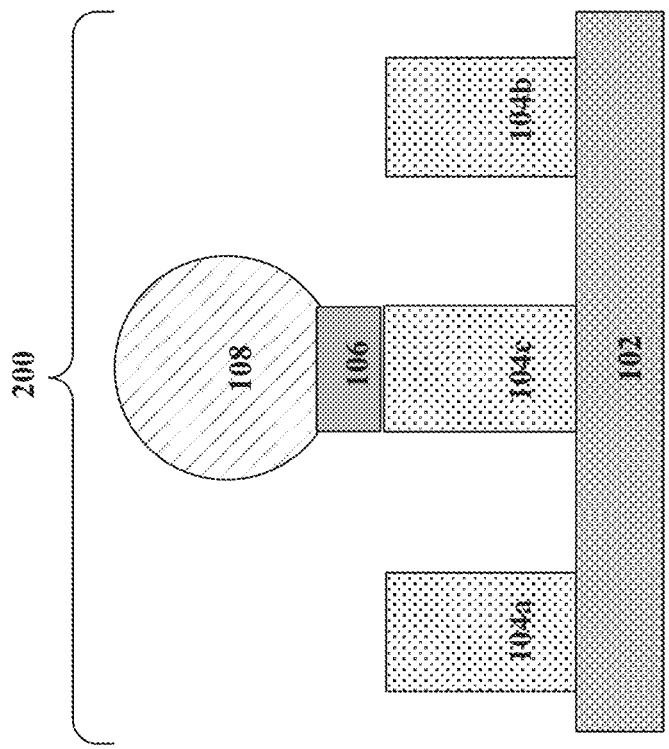
FIG. 2A illustrates a non-limiting view of a temperature switch in accordance with one or more embodiments described herein.

FIG. 2A illustrates a non-limiting view of a temperature switch in accordance with one or more embodiments described herein. Repetitive description of like elements employed in other embodiments described herein is omitted for sake of brevity.

FIG. 2A depicts a temperature switch 200 in an alternate configuration than that of the temperature switch 100. For example, the temperature switch 200 can be configured in an "on" position wherein the metal alloy 108 is in contact with the electrodes 104*a*, 104*b*, 104*c* forming a closed circuit. Additionally, the surface 106 can be disposed between the center electrode 104*c* and the metal alloy 108. Because the surface 106 comprises a wetting property, during a temperature excursion, the metal alloy 108 can transform into a ball and retract towards the surface 106 (e.g., metal surface) while retracting away from the electrodes 104*a*, 104*b* as depicted in FIG. 2B.

Figure 2B:
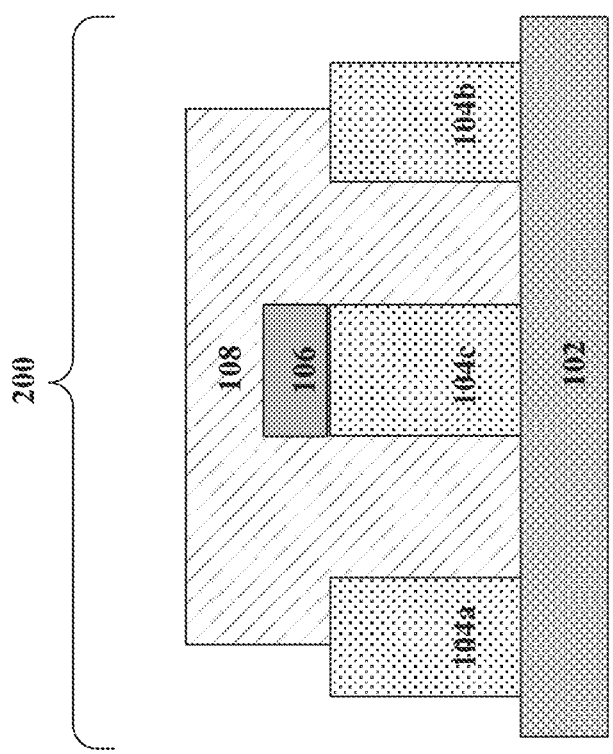
FIG. 2B illustrates a non-limiting view of a temperature switch that has experienced a temperature excursion in accordance with one or more embodiments described herein.

FIG. 2B illustrates a non-limiting view of a temperature switch that has experienced a temperature excursion in accordance with one or more embodiments described herein. Repetitive description of like elements employed in other embodiments described herein is omitted for sake of brevity.

Once the temperature of the temperature switch 200 exceeds the melting point of the metal alloy 108, the temperature switch 200 can transition from a closed circuit to an open circuit, thus shorting an electrical connection between the electrodes 104*a*, 104*b*. The wetting property of the surface 106 causes the metal alloy 108 to retract into a ball when the temperature switch 200 experiences a temperature excursion. For example, gold (Au) is a common wetting material. Thus, gold can be used as the surface 106 to facilitate the metal alloy 108 pulling from the electrodes that do not comprise the surface 106. It should also be noted that after the temperature of the temperature switch 200 returns to a value below the melting point of the metal alloy 108, the circuit can remain open as depicted in FIG. 2B. Thus, the electrodes 104*a*, 104*b* remain disconnected although it is apparent that at least one temperature excursion has occurred.

FIGS. 3A and 3B illustrate non-limiting views of a temperature switches in alternate configurations in accordance with one or more embodiments described herein. Repetitive description of like elements employed in other embodiments described herein is omitted for sake of brevity.

In various embodiments, the configuration of the temperature switch 300 can be altered. For example, as depicted in FIG. 3A, the electrodes 104*a*, 104*b*, the surfaces 106*a*, 106*b*, and the metal alloy 108 can be oriented on the same plane (e.g., horizontally) as the substrate 102 by being connection to a mechanical support 302 (e.g., nitride, oxide, polymer, etc.). Thus, the melting point of the metal alloy 108, can affect how quickly (e.g., as a function of time) the metal alloy 108 comes into contact with surfaces 106*a*, 106*b*. In another embodiment, as depicted in FIG. 3B, a first electrode 104*a* and a first surface 106*a* can be oriented perpendicular (e.g., vertically) to the substrate 102, and a second electrode 104*b* and a second surface 106*b* can be oriented in the same plane as the substrate 102 (e.g., horizontally) and attached to a mechanical support 302 (e.g., nitride, oxide, polymer, etc.). Thus, during a temperature excursion, the melting property of the metal alloy 108, the gravitational pull, and the wetting property of the first surface 106*a* and the second surface 106*b* can facilitate the metal alloy 108 melting as a function of time.

Figure 4:
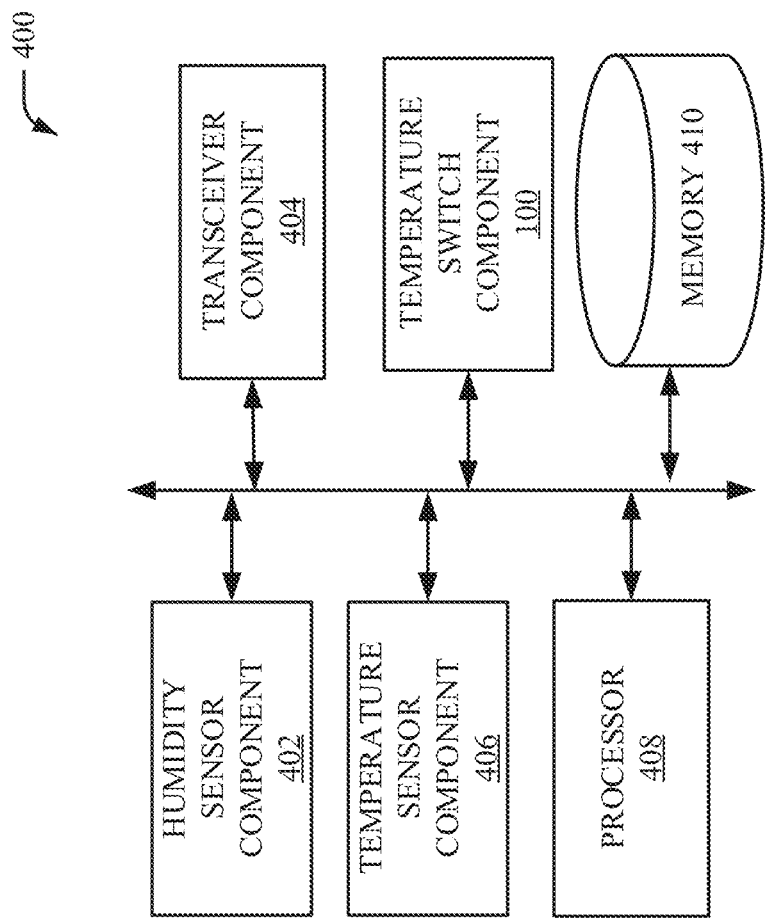
FIG. 4 illustrates a non-limiting zero-power temperature switch system in accordance with one or more embodiments described herein.

FIG. 4 illustrates a non-limiting zero-power temperature switch system in accordance with one or more embodiments described herein. Repetitive description of like elements employed in other embodiments described herein is omitted for sake of brevity.

The temperature switch 100 of the system 400 can be manufactured such that it is in an "off" position (e.g., open circuit, FIG. 1A) and a temperature excursion causes the temperature switch 100 to transition to an "on" position by closing the circuit (e.g., FIG. 1B) between the electrodes as discussed previously. The system 400 can also comprise a humidity sensor component 402, a temperature sensor component 406, a transceiver component, a processor 408 and a memory 410, and/or a battery component (not shown), which can be electrically and/or communicatively coupled to one another in various embodiments. In alternative embodiments, components can be added or deleted based on a specific outcome to be achieved. Thus, when the temperature switch 100 is activated due to a temperature excursion, the humidity sensor component 402, the transceiver component 404, and or the temperature sensor component 406 can be activated due to the circuit closing. The humidity sensor component 402 and the temperature sensor component 406 can measure a humidity and a temperature associated with the system 400, respectively. This data can then be sent, via the transceiver component 404, to a receiver component (not shown) that is internal or remote to the system 400.

Figure 5:
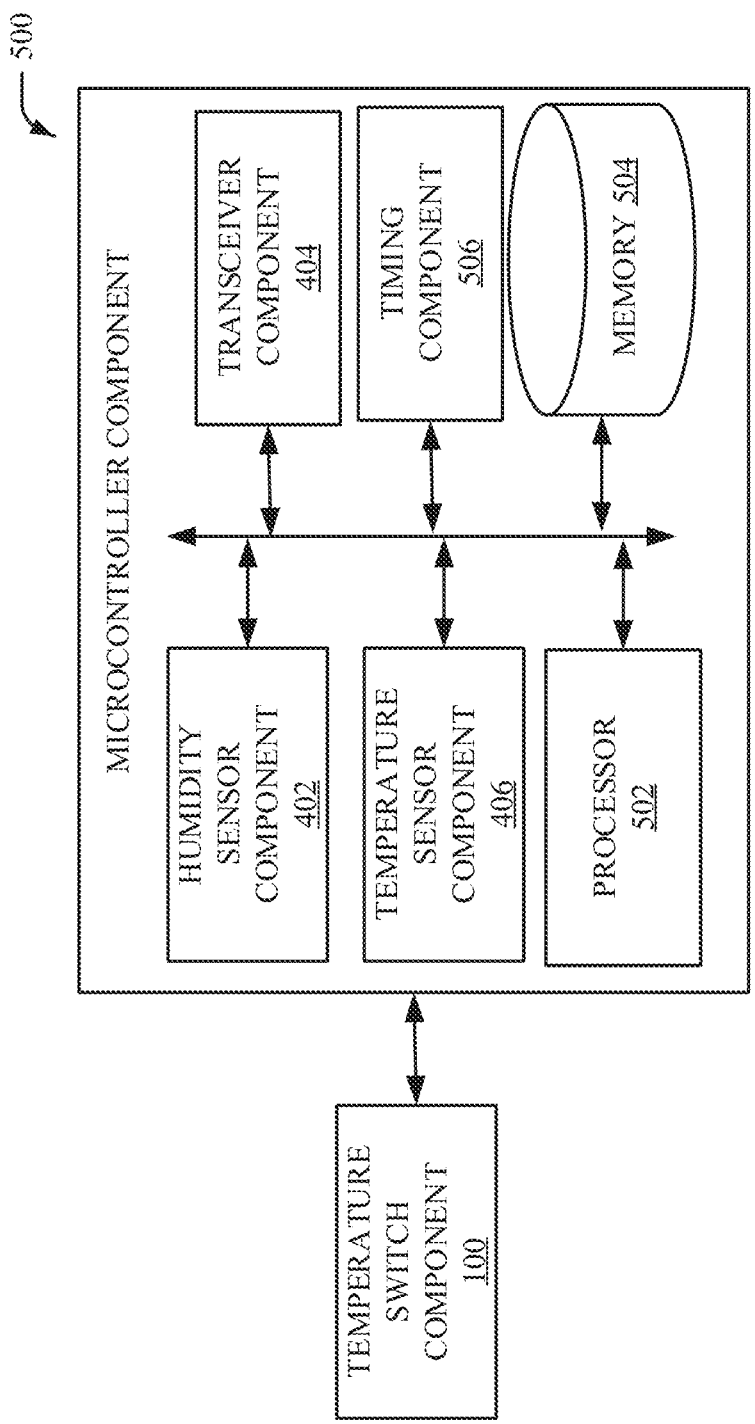
FIG. 5 illustrates a non-limiting temperature switch system comprising a microcontroller component in accordance with one or more embodiments described herein.

FIG. 5 illustrates a non-limiting a zero-power temperature switch system comprising a microcontroller component in accordance with one or more embodiments described herein. Repetitive description of like elements employed in other embodiments described herein is omitted for sake of brevity.

In another embodiment, the temperature switch 100 can be external to a microcontroller component 500. The microcontroller component 500 can comprise several sub-components (e.g., the humidity sensor component 402, the temperature sensor component 406, the transceiver component 404, a timing component 506, and/or other subcomponents not shown), a processor 502 and a memory 504, which can be electrically and/or communicatively coupled to one another in various embodiments. It should also be noted that, in some embodiments, the subcomponents (e.g., the humidity sensor component 402, the temperature sensor component 406, the transceiver component 404, and/or other subcomponents not shown) can be external to the microcontroller component 500.

Although the temperature switch 100 can be manufactured such that it is in an "off" position (e.g., open circuit, FIG. 1A) and a temperature excursion causes the temperature switch 100 to transition to an "on" position by closing the circuit (e.g., FIG. 1B) between the electrodes, it should also be noted that the temperature switch 100 can be manufactured in an "on" position (e.g., FIG. 2A) causing the humidity sensor component 402, the temperature sensor component 406, and/or the transceiver component 404 to initially be operable. Thus, a temperature excursion can cause the temperature switch 100 to toggle to an "off" position based on the circuit opening (e.g., FIG. 2B). Consequently, the humidity sensor component 402, the temperature sensor component 406, and/or the transceiver component 404 will cease operation. In alternative embodiments, components can be added or deleted based on a specific outcome to be achieved. For example, a battery component (not shown) can be coupled to the temperature switch 100. A temperature excursion can cause the battery component to activate thereby activating other components. Alternatively, when the temperature switch 100 is activated due to a temperature excursion, the humidity sensor component 402, the transceiver component 404, and or the temperature sensor component 406 can be activated due to the circuit closing (e.g., FIG. 1B). The humidity sensor component 402 and the temperature sensor component 406 can measure a humidity and a temperature associated with the system 400, respectively. This data can then be sent, via the transceiver component 404, to a receiver component (not shown) that is internal or remote to the system 400. The timing component 506 can be configured to determine a duration associated with the duration of the temperature excursion. For example, once the temperature excursion has occurred, the time, date, and/or duration associated with the temperature excursion can be generated and then stored in the memory 504. Time data associated with the time, date, and/or duration can also be sent to an external device.

FIGS. 6A-9B illustrate a non-limiting zero-power temperature switch fabrication process in accordance with one or more embodiments described herein. Repetitive description of like elements employed in other embodiments described herein is omitted for sake of brevity.

As mentioned previously, the temperature switch 100 can be built on BEOL of a CMOS, on a flexible material, a flexible antenna, or any substrate. The fabrication process can comprise sputtering a seed layer 600 (e.g., a copper layer between two titanium layers) on the substrate 102. Sputtering is a physical vapor deposition (PVD) method of thin film deposition that involves ejecting material from a "target" that is a source onto a "substrate" such as a silicon wafer. Sputtered atoms ejected from the target have a wide energy distribution, typically up to tens of electron volts. The sputtered ions can impact the substrates or vacuum chamber (causing re-sputtering). Alternatively, at higher gas pressures, the ions can collide with the gas atoms that act as a moderator and move diffusively, reaching the substrates or vacuum chamber wall and condensing after undergoing a random walk. The entire range from high-energy ballistic impact to low-energy thermalized motion is accessible by changing the background gas pressure. For efficient momentum transfer, the atomic weight of the sputtering gas should be close to the atomic weight of the target. For sputtering light elements neon is preferable, and for sputtering heavy elements krypton or xenon are used. Reactive gases can also be used to sputter compounds. The compound can be formed on the target surface, in-flight, or on the substrate depending on the process parameters.

Figure 6A:
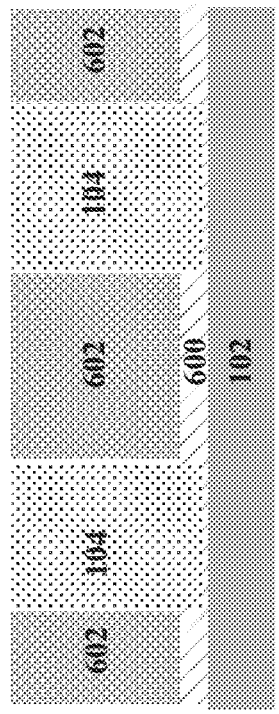
FIG. 6A illustrates a non-limiting temperature switch fabrication process comprising patterning a resist layer in accordance with one or more embodiments described herein.

Thus, a first resist layer 602 can be applied on the sputtered seed layer 600, and the first resist layer 602 can undergo a lithography process, to pattern the first resist layer 602, as depicted in FIG. 6A. Patterning is the shaping or altering of deposited materials, and is generally referred to as lithography. For example, in conventional lithography, the wafer is coated with a chemical called a photoresist, then a machine called a stepper, focuses, aligns, and moves a mask, exposing select portions of the wafer below to short wavelength light. The exposed regions are then washed away by a developer solution. After etching or other processing, the remaining photoresist is removed. The etching process can include a dry etch (e.g., reactive ion etching, plasma etching, ion beam etching, or laser ablation). The etching process can alternatively include a wet chemical etch (e.g., with potassium hydroxide, or sulfuric acid and hydrogen peroxide). In some exemplary embodiments, both dry etching and wet chemical etching processes can be used. After transferring the pattern, the patterned photoresist is removed utilizing resist stripping processes, for example, ashing. Ashing can be used to remove a photoresist material, amorphous carbon, or organic planarization (OPL) layer. Ashing is performed using a suitable reaction gas, for example, $O_2$, $N_2$, $H_2/N_2$, $O_3$, $CF_4$, or any combination thereof. Patterning also includes electron-beam lithography, nanoimprint lithography, and reactive ion etching.

Figure 6B:
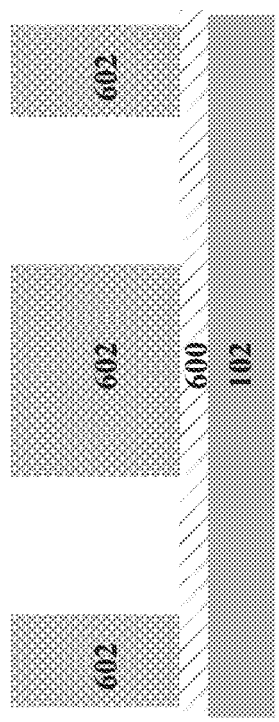
FIG. 6B illustrates a non-limiting temperature switch fabrication process comprising removing an exposed area of a seed layer in accordance with one or more embodiments described herein.
Figure 7A:
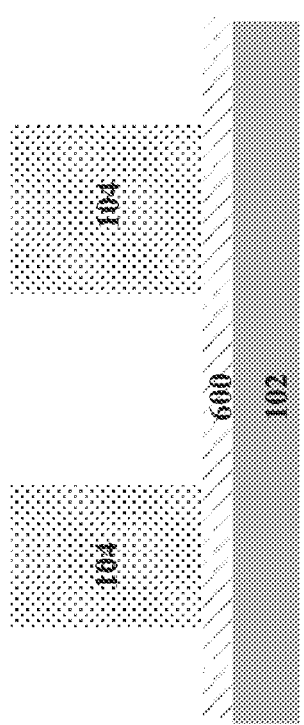
FIG. 7A illustrates a non-limiting temperature switch fabrication process comprising stripping a first resist layer in accordance with one or more embodiments described herein.
Figure 7B:
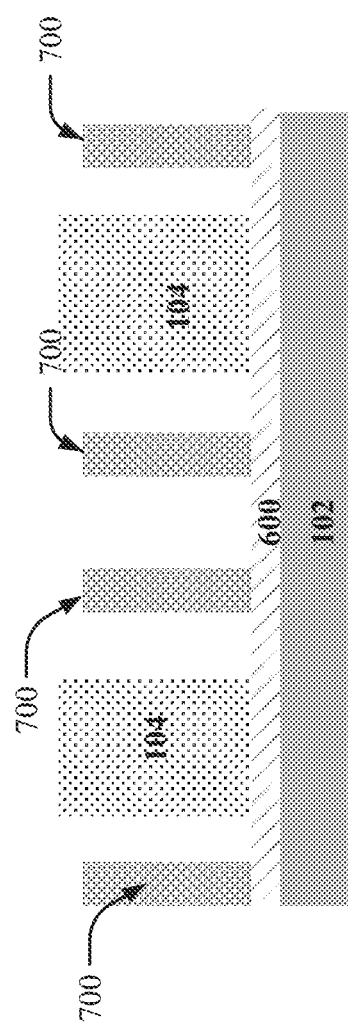
FIG. 7B illustrates a non-limiting temperature switch fabrication process comprising adding a third resist layer in accordance with one or more embodiments described herein.
Figure 8A:
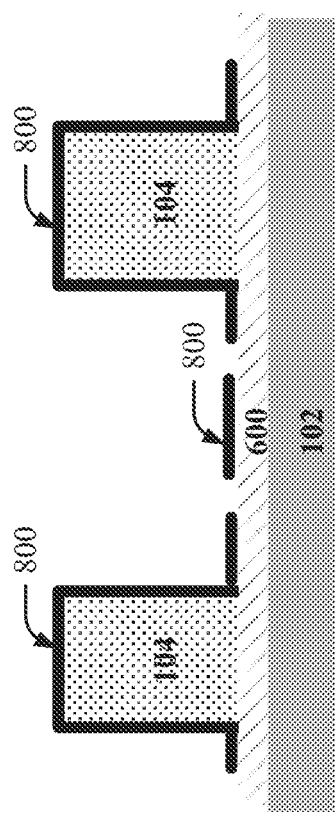
FIG. 8A illustrates a non-limiting temperature switch fabrication process comprising a lithographic procedure in accordance with one or more embodiments described herein.
Figure 8B:
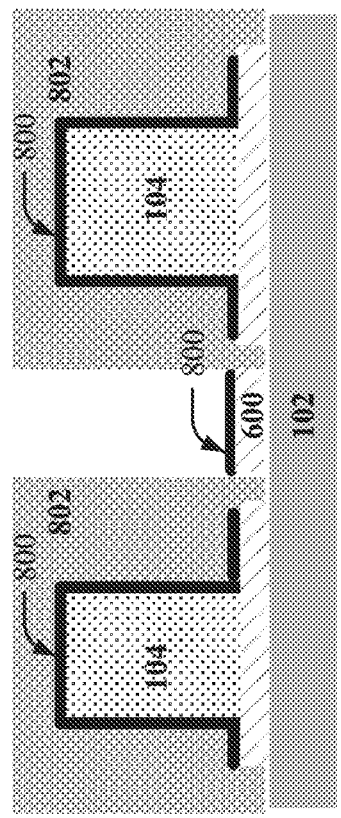
FIG. 8B illustrates a non-limiting temperature switch fabrication process comprising depositing a fourth resist layer in accordance with one or more embodiments described herein.
Figure 9A:
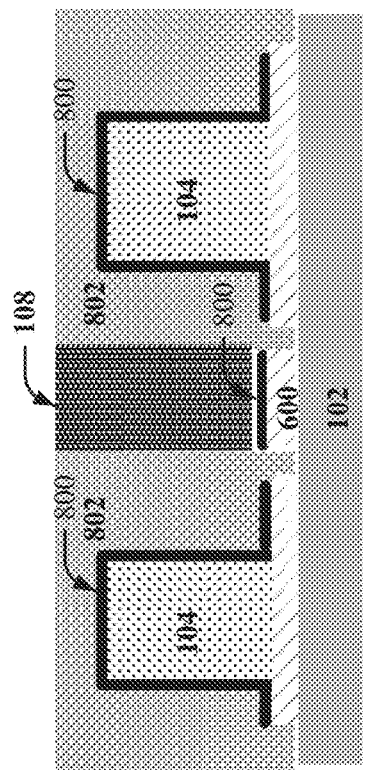
FIG. 9A illustrates a non-limiting temperature switch fabrication process comprising depositing a metal alloy in accordance with one or more embodiments described herein.
Figure 9B:
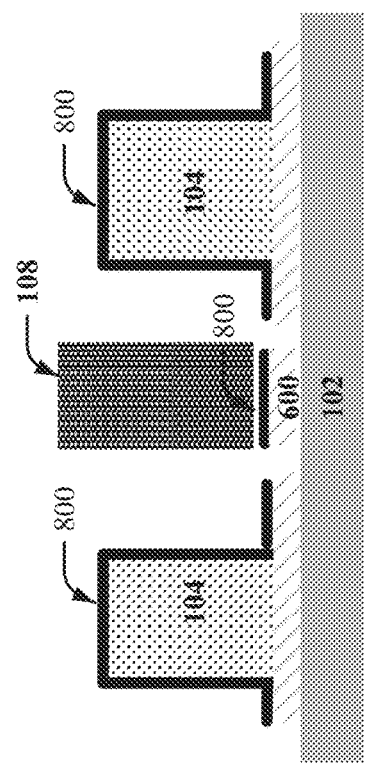
FIG. 9B illustrates a non-limiting temperature switch fabrication process comprising stripping a fourth resist layer in accordance with one or more embodiments described herein.

After the first resist layer 602 undergoes the lithography process, a dilute hydrofluoric acid (DHF) dip can remove an exposed area of the seed layer 600 prior to plating the seed layer 600 with 2 micrometers of nickel as shown in FIG. 6B. The first resist layer 602 can then be stripped as depicted in FIG. 7A leaving the nickel behind. The next step can comprise adding a second resist layer prior to plating 5 micrometers of nickel and then removing the second resist layer. A third resist layer 700 can be added as shown in FIG. 7B. FIG. 8A depicts the temperature switch 100 after the third resist layer 700 has been stripped and a lithographic procedure has taken place. 100 nanometers of gold 800 can then be plated on top of the nickel (e.g., to form electrode 104). A fourth resist layer 802 can be added as illustrated in FIG. 8B and specific areas of the seed layer can be stripped via a lithographic process. Thereafter, the metal alloy 108 can be deposited as shown in FIG. 9A, and the fourth resist layer 802 can be stripped as represented by FIG. 9B. It should be noted that various elements and compositions of elements, comprising various melting points, can be used for the metal alloy 108 including, but not limited to: 95 molecules of gallium, 100 molecules of gallium, 51 molecules of indium 32.5 molecules of bismuth 16.5 molecules of tin, 66.3 molecules of indium 33.7 molecules of bismuth, 33 molecules of indium 67 molecules of bismuth, 52 molecules of indium 48 molecules of tin, 50 molecules of indium 50 molecules of tin, 48 molecules of indium 52 molecules of tin, 58 molecules of bismuth 42 molecules of tin, 42 molecules of indium 58 molecules of tin, 100 molecules of indium, 40 molecules of bismuth 60 molecules of tin, tin 9 molecules of zinc, tin 3.5 molecules of gold 0.7 molecules of copper, tin 3.5 molecules of gold, tin 0.7 molecules of copper, and/or 100 molecules of tin.

FIG. 10 illustrates a flow diagram of an example, non-limiting method for facilitating a determination of a temperature excursion in accordance with one or more embodiments described herein. Repetitive description of like elements employed in other embodiments described herein is omitted for sake of brevity.

In another embodiment, a method 1000 can comprise causing a metal alloy 108 to melt and contact a first electrode (e.g., electrode 104) and second electrode (e.g., surfaces 106 and electrodes 104) based on a temperature excursion of the metal alloy 108 at element 1002, resulting in a contact, wherein the contact forms an electrical connection between the first electrode and the second electrode (e.g., FIG. 1B). Additionally, at element 1004, the method 1000 can comprise transmitting a signal (e.g., via the transceiver component 404), to an external reader device, utilized to determine that the temperature excursion has occurred based on a configuration change associated with the electrical connection.

Figure 11:
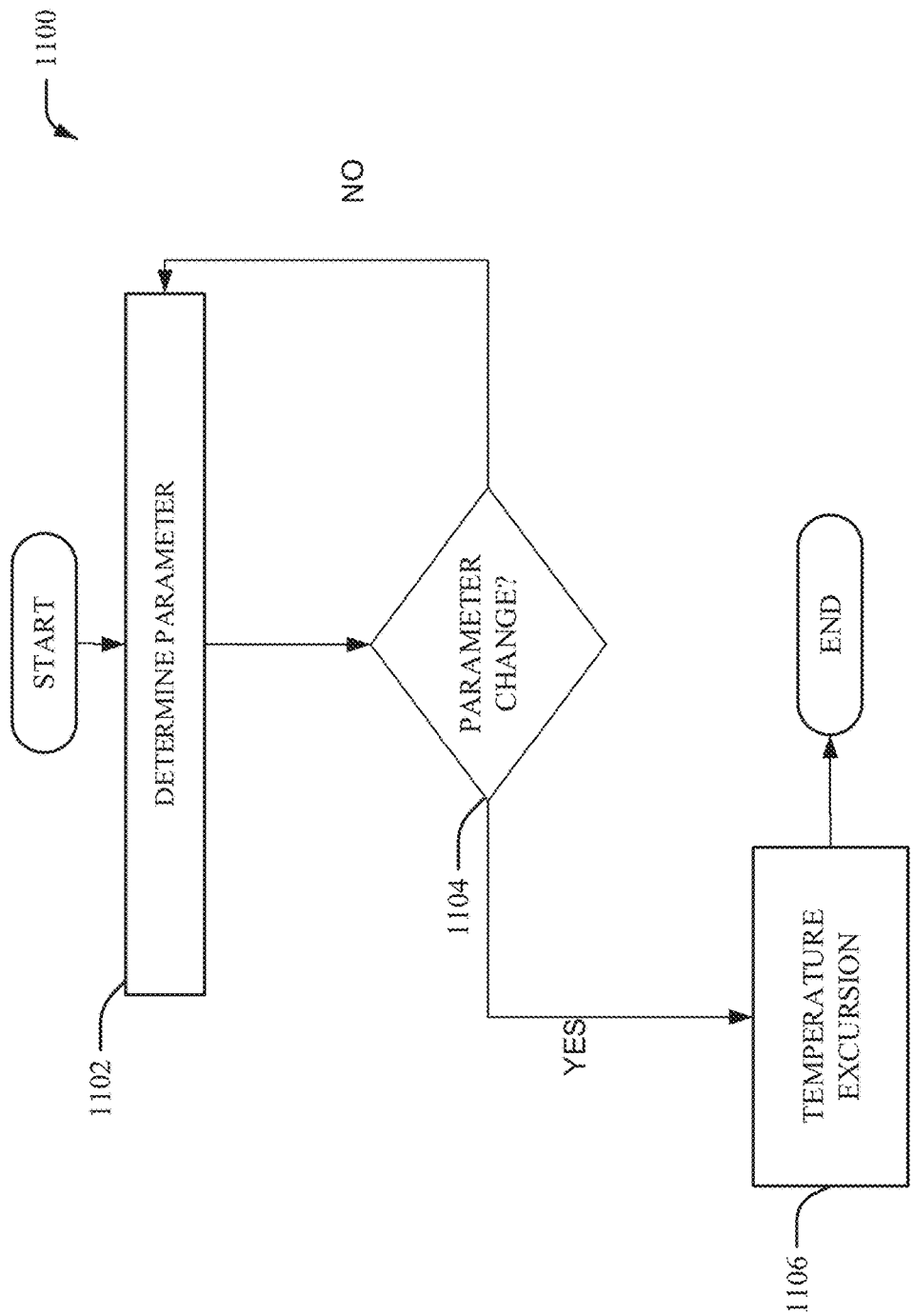
FIG. 11 illustrates a flow diagram of an example, non-limiting process for facilitating a determination of a temperature excursion in accordance with one or more embodiments described herein.

FIG. 11 illustrates a flow diagram of an example, non-limiting process 1100 for facilitating a determination of a temperature excursion in accordance with one or more embodiments described herein. Repetitive description of like elements employed in other embodiments described herein is omitted for sake of brevity.

The process 1100 can comprise determining a parameter at block 1102. The parameter can be associated with an electronic circuit. For example, the parameter can be the resonant frequency associated with an antenna attached to the temperature switch 100. However, a parameter change can be caused by the temperature switch 100 shorting and causing a change to the resonant frequency of the antenna. Therefore, the process can comprise a parameter change at block 1104 based on whether a temperature excursion (e.g., at temperature switch 100) has occurred. If a parameter has changed at block 1104, then it can be determined that a temperature excursion (e.g., at temperature switch 100) has occurred at block 1106. For example, a frequency change can be determined based on a signal that has been sent to the microcontroller component 500 or received from (e.g., sent by the transceiver component 404) the microcontroller component 500. Consequently, because the temperature excursion changes a physical characteristic of the temperature switch 100 by closing a circuit, the changed parameter associated with the antenna can be determined to indicate that a temperature threshold has been met and/or surpassed. Conversely, if a parameter (e.g., frequency) remains the same, then in one embodiment, a temperature excursion has not occurred.

Figure 12:
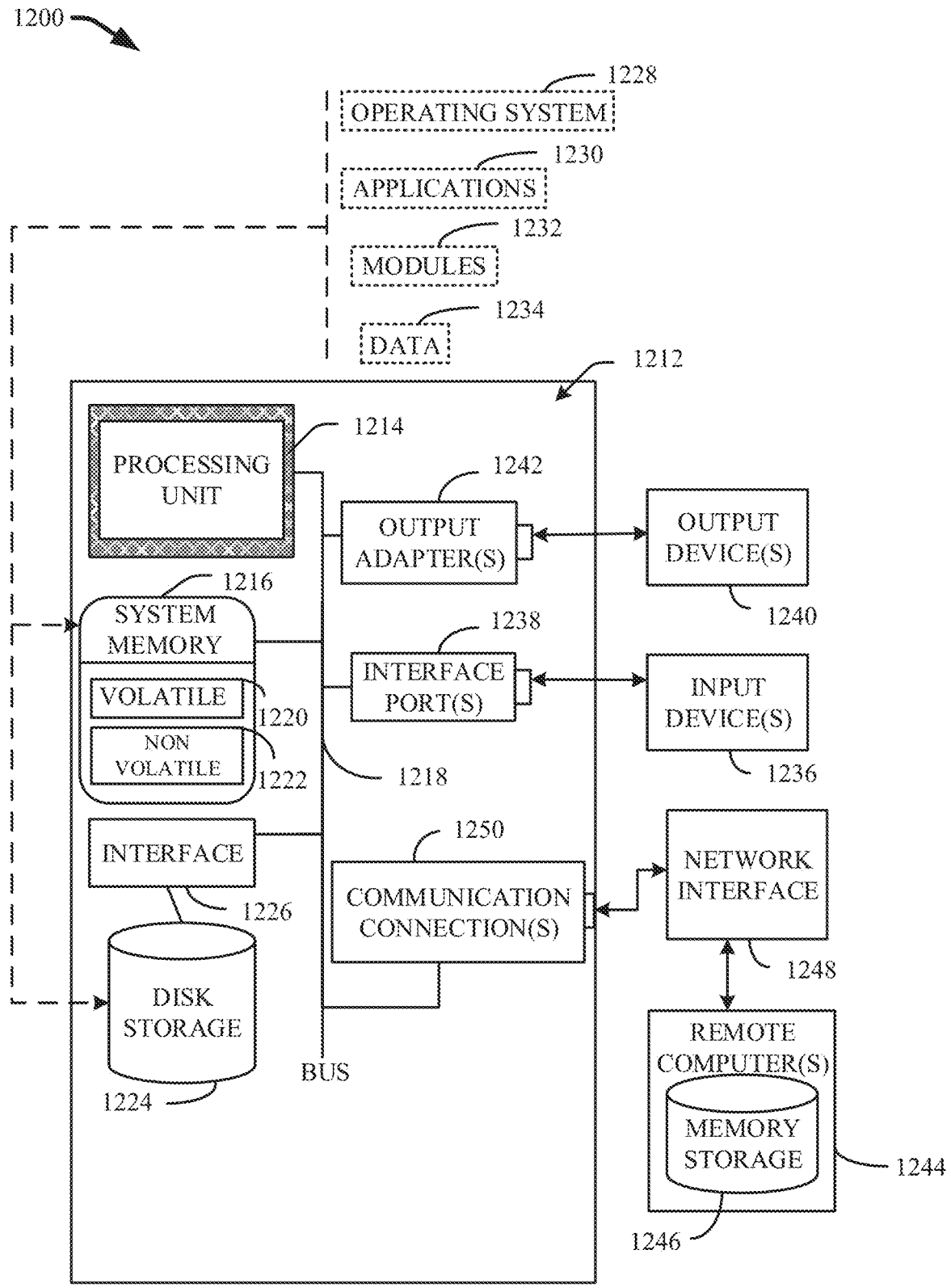
FIG. 12 illustrates a block diagram of an example, non-limiting operating environment in which one or more embodiments described herein can be facilitated.

In order to provide a context for the various aspects of the disclosed subject matter, FIG. 12 as well as the following discussion is intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/nonvolatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1201. Such software can also include, for example, an operating system 1228. Operating system 1228, which can be stored on disk storage 1224, acts to control and allocate resources of the computer 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a first electrode disposed on a substrate layer, wherein a first side of the first electrode is adjacent and coupled to a first metal sidewall, wherein a second side of a second electrode is adjacent and coupled to a second metal sidewall, the first metal sidewall facing the second metal sidewall, wherein a first edge of the first electrode is disposed directly on and coupled to the substrate layer, wherein a second edge of the second electrode, a third edge of the first metal sidewall, a fourth edge of the second metal sidewall and a fifth edge of the first electrode are disposed directly on and coupled to a mechanical support having a sixth edge disposed directly on and coupled to the substrate layer, and wherein there is a gap between the first metal sidewall and the second metal sidewall; and
a metal alloy disposed on the mechanical support and within the gap, wherein the metal alloy melts based on a temperature excursion of the metal alloy and the melting causes the metal alloy to contact the first metal sidewall and the second metal sidewall causing an electrical connection between the first metal sidewall and the second metal sidewall.

2. The apparatus of claim 1, wherein the first metal sidewall within the gap comprises a wetting property to react with the metal alloy.

3. The apparatus of claim 1, wherein the metal alloy is a solder alloy selected from a group consisting of:
gallium, indium, zinc, gold, copper, bismuth, tin, tin and gold, tin and copper, tin and zinc, or tin, gold, and copper.

4. The apparatus of claim 1, wherein the metal alloy retracts from a surface within the gap based on a temperature decrease to a temperature lower than the temperature excursion, resulting in a removal of the electrical connection.

5. The apparatus of claim 2, wherein the first metal sidewall is at a first position relative to the metal alloy, wherein the second metal sidewall is at a second position relative to the metal alloy, the first position being on a first side of the metal alloy and the second position being opposite the first position, and wherein the first metal sidewall and the second metal sidewall comprise a wetting property to facilitate a dispersion of the metal alloy.

6. The apparatus of claim 1, wherein the temperature excursion comprises a temperature of the metal alloy exceeding a defined value.

7. A method, comprising:
a metal alloy of a device melting and contacting a first electrode and second electrode based on a temperature excursion of the metal alloy, resulting in a contact forming an electrical connection between the first electrode and the second electrode, wherein the first electrode is disposed on a substrate layer, wherein a first side of the first electrode is adjacent and coupled to a first metal sidewall, wherein a second side of the second electrode is adjacent and coupled to a second metal sidewall, the first metal sidewall facing the second metal sidewall, wherein a first edge of the first electrode is disposed directly on and coupled to the substrate layer, wherein a second edge of the second electrode and a third edge of the first electrode are disposed directly on and coupled to a mechanical support having a fourth edge disposed directly on and coupled to the substrate layer; and
transmitting a signal, to an external reader device and utilized to determine that the temperature excursion has occurred, wherein the transmitting is initiated based on a configuration change associated with the electrical connection.

8. The method of claim 7, wherein a parameter change from a first parameter to a second parameter, different than the first parameter, is prompted by the configuration change.

9. The method of claim 8, wherein the parameter change comprises a resonant frequency change, associated with a radio frequency identification tag, from a first resonant frequency to a second resonant frequency different than the first resonant frequency.

10. The method of claim 7, wherein the electrical connection activates a humidity sensor or a temperature sensor coupled to the electrical connection.

11. The method of claim 7, further comprising:
generating duration data representative of a duration that the temperature excursion has exceeded a defined threshold value.

12. The method of claim 7, further comprising:
causing the metal alloy to retract based on a temperature decrease to a temperature lower than the temperature excursion, resulting in a termination of the electrical connection.

13. The apparatus of claim 1, wherein the mechanical support is perpendicular to the substrate layer.

* * * * *